Oct. 23, 1923.　　　　　　　　　　　　　　　　　1,472,032
G. MADAUS
APPARATUS FOR APPLYING VOLATILE SUBSTANCES TO THE HUMAN BODY
Filed Aug. 29, 1921
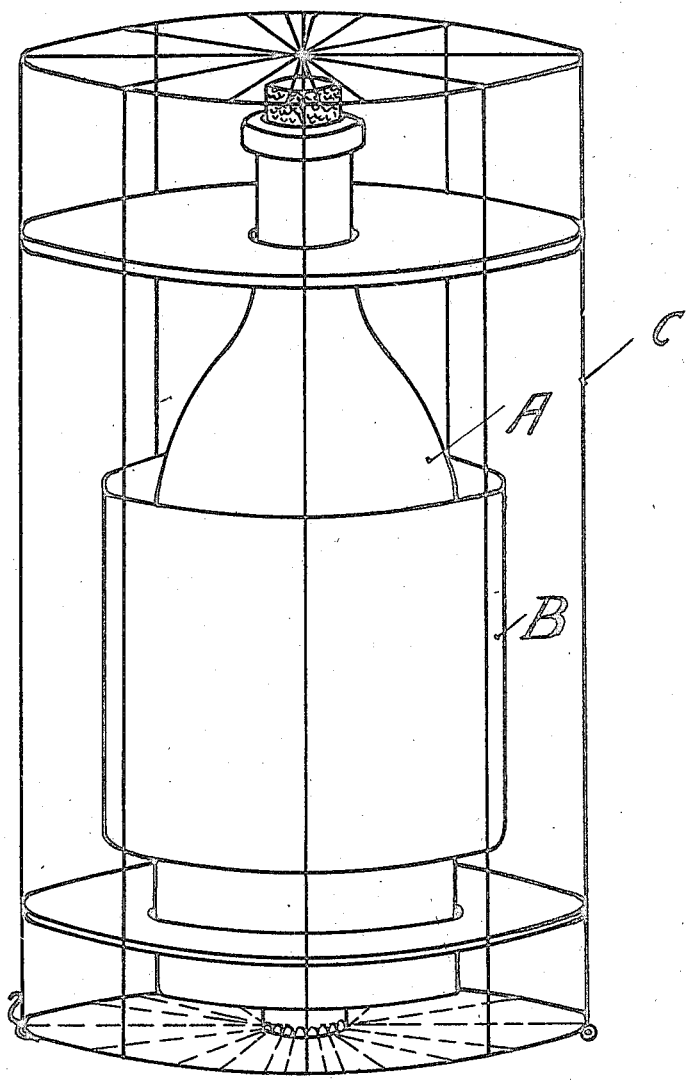
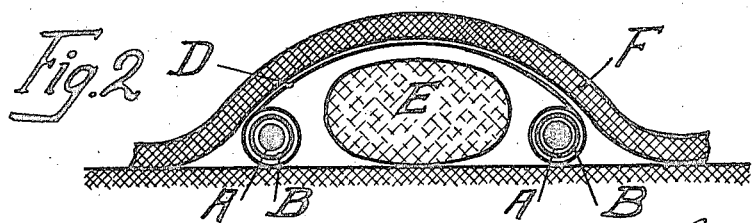

Patented Oct. 23, 1923.

1,472,032

UNITED STATES PATENT OFFICE.

GERHARD MADAUS, OF BONN, GERMANY.

APPARATUS FOR APPLYING VOLATILE SUBSTANCES TO THE HUMAN BODY.

Application filed August 29, 1921. Serial No. 496,495.

(GRANTED UNDER THE PROVISIONS OF THE ACT OF MARCH 3, 1921, 41 STAT. L., 1313.)

*To all whom it may concern:*

Be it known that I, GERHARD MADAUS, a citizen of the German Republic, residing at Bonn, Rhine, Arndtstrasse 19, Germany, have invented certain new and useful Improvements in Apparatus for Applying Volatile Substances to the Human Body (for which I have filed an application in Germany Feb. 23, 1920, Patent No. 351,546), of which the following is a specification.

This invention relates to an apparatus devised to allow substances which are easily volatilizable to re-act on the human body for a more or less prolonged period, say for several hours or even throughout the night.

In accordance with the invention, the substance to be volatilized is attached to a neutral support, for instance to a hollow cylinder in the form of a sleeve. This support is exposed to the influence of a source of heat, and causes the volatilizable substance to evaporate. When the support is formed as a sleeve, a heat supply, such for instance as that called a thermophor, can be placed inside the sleeve, or a bottle filled with hot water or the like be arranged so as to heat the sleeve from the inside, and cause the substance placed upon its outer surface to volatilize.

Both the source of heat and the support for the volatilizable substance are enclosed and held within a wire frame in such a manner that neither of them can be touched by the body of the patient outside. Thus, for instance, a source of heat in the form of a bottle can be fixed in any convenient way in the axis of a cylindrical wire frame, preferably by the provision of two discs having circular apertures, which discs are fixed to the wire frame. The sleeve then comes to lie, with or without an intervening space, round about the source of heat. The wire frame is arranged capable of being opened in order to effect easily the interchange of the heater and of the sleeve.

When in use, one or more of these apparatuses are placed in the vicinity of the human body, which is in an enclosed space together with them, preferably under bed clothes. In this case, these devices are placed preferably at both sides of the body, and they may be connected above the body by means of one or more wire arches at suitable distances apart which serve at the same time to hold the wire frames of the apparatuses in the proper position. A device of this kind can be constructed to be very suitable for use in hospital beds in such a manner that the evaporating bodies and the sources of heat lie fixed at the sides, and the bed clothes enclose the whole apparatus tightly. In this manner the body undergoes an intensive treatment with the medicinal substances to be volatilized.

According to the nature of the disease to be treated the sleeves or the like can, for instance, be coated with quicksilver, sulphur dioxide, arsenic, salicylic acid, eucalyptus, sulphur and its derivatives, ethereal oils and so forth. By the action of heat these materials then evaporate and re-act upon the body of the patient.

In the drawing a construction of the invention is illustrated as follows:—

Fig. 1 shows the apparatus in perspective,

Fig. 2 shows the use of the apparatus in cross section through a sick-bed.

A indicates the source of heat, here represented simply as a bottle filled with hot water. B indicates the sleeve-shaped support of the volatizable substance. This substance is not necessarily spread over the entire surface of the sleeve, but is preferably applied as a one-sided layer, and this side turned towards the body of the patient. The bottle and the sleeve are placed, turned to the outside, in the axis of the cylindrical wire basket C, which can be opened underneath for their insertion. In use it is preferable to have two such devices connected together by one or more arched wires D passing above the body E of the patient. The wires D serve to uphold the bed clothes F at the requisite distance from the body so that the volatilized substances can act upon it from above also.

Having now particularly described and ascertained the nature of my said invention and in what manner the same is to be performed, I declare that what I claim is:—

A source of heat, a sleeve-shaped support for a volatilizable substance surrounding said source of heat, a cylindrical wire basket around the same, combined with a similar structure spaced therefrom, and an arched wire support for the bed-clothes, said wire support joining the said two structures.

In testimony whereof I affix my signature in presence of two witnesses.

GERHARD MADAUS.

Witnesses:
ROBERT ALMERK,
CARL FALM.